United States Patent [19]

Lakin et al.

[11] 4,354,571
[45] Oct. 19, 1982

[54] PROTECTIVE SYSTEM FOR USE IN TRANSFER OF HAZARDOUS SUBSTANCES

[75] Inventors: John Lakin, Verwood; Philip R. Watson, Sundbury-on-Thames, both of England

[73] Assignee: Moorwats Safety Systems Limited, Middlesex, England

[21] Appl. No.: 231,582

[22] Filed: Feb. 4, 1981

[51] Int. Cl.³ .......................... F16K 11/20; B60P 9/00
[52] U.S. Cl. .................................. 180/271; 137/78.1; 137/267
[58] Field of Search ............... 137/78.1, 267; 180/271; 280/5 C, 421; 123/198 D

[56] References Cited

U.S. PATENT DOCUMENTS 2,001,453  5/1935  Crossen ................................ 137/267
2,696,361 12/1954  Jensen ................................. 137/267
3,360,000 12/1967  Weston ................................ 137/267
3,927,650 12/1975  Reed ................................ 123/198 D Primary Examiner—Alan Cohan Attorney, Agent, or Firm—Emory L. Groff, Jr.

[57] ABSTRACT

A safety and control system for the product outlet valves of a vehicle tank has pneumatically operated valves associated with each product outlet of the tank, control valves are connected to an air reservoir through a charge valve for effecting operation of the outlet valves, the charge valve being of a single shot type for pressurizing a manifold connected to the product outlet valve or valves. The manifold is connected with emergency release valves and a further solenoid operated valve is operatively connected with a gas detector means. With this arrangement either on detection of escaping product vapor by the gas detector or actuation of the emergency release valves pressure in the manifold is vented thereby closing the product outlet valves through release of pressure, the control valves thereafter being inoperative until the charge valve is actuated to re-pressurize the manifold.

A system for protecting and also shutting down the vehicle engine is also disclosed.

8 Claims, 5 Drawing Figures

PROTECTIVE SYSTEM FOR USE IN TRANSFER OF HAZARDOUS SUBSTANCES

BACKGROUND OF THE INVENTION

This invention relates to a protective system for use in the transfer of hazardous substances and is primarily, but not essentially, directed to a protective system for use with a vehicle carrying liquid petroleum gas (LPG) which is operative during transfer of the liquid gas from a vehicle to a storage point. It will be appreciated that the system described herein can be adapted for use during transfer of other hazardous liquids and chemicals.

One object of this invention is to provide a system incorporating a gas detecting means which is arranged to shut down the product outlet valves of a vehicle or trailer when gas is detected. Another object is to provide an improved system which shuts down an internal combustion engine in a manner intended to prevent intake of gas by the engine.

In this invention the system is divided into two separate parts with one part associated with the gas containing means, for example the trailer portion of a vehicle, whilst the other part is associated with the engine unit, for example the tractor part of a semi-trailer combination.

SUMMARY OF THE INVENTION

According to a first aspect of this invention there is provided a control system for the product outlet valves of a storage tank, the system comprising one or more pneumatically operated valves associated with the or each product outlet of the storage tank, a control valve connected to an air reservoir through a charge valve for effecting operation of the pneumatic outlet valves, the charge valve being of a single shot type for pressurising a manifold connected to the product outlet valve or valves, the manifold being associated with one or more emergency release valves and a further solenoid operated valve operatively connected with a gas detector means, detection of escaping product vapour by the gas detector or actuation of the emergency release valve effecting discharge of pressure in the manifold by venting to close the product outlet valves by release of said pressure, the control valves thereafter being inoperative until the charge valve is actuated to re-pressurise the manifold.

With such an arrangement the operation of opening the product valves to transfer, for example LPG, comprises selection of the appropriate product valve by means of the control valve and thereafter operating the charge valve to pressurise one or more of the selected product valves. On release of the charge valve pressure is retained within the manifold system connecting the product valves and such pressure can be released through the manual emergency valves which may be remote from the container or automatically by means of a gas detector means. Once pressure in the manifold system is vented actuation of the control valves will not operate the product transfer valves unless the charge valve is operated to replenish the manifold from the air reservoir. Preferably the air reservoir is charged from the emergency air reservoir associated with a storage tank which is contructed as a vehicle trailer and an appropriate pressure check valve is provided whereby emergency air reservoir pressure is not reduced below the value which would result in automatic application of the trailer brake system. Between the emergency air reservoir and the air reservoir associated with the control system a non-return valve is provided.

The emergency release valves will preferably be provided at each end of the trailer and a coupling may be provided for connection of a further flexible air line which may be routed to a remote location. With this system a loss of pressure for example due to fracture or burning through of the manifold or the associated lines will result in fail-safe operation.

The manifold line may further include a solenoid operated valve which would normally vent this line when no electric power is fed to the system in which cass the gas detector means would be inoperative. The electrical coupling line to the vehicle tractor unit is connected so that this valve is closed when power is present. A manual override is preferably provided so that product transfer can be made if necessary without electric power and in such case the emergency release valves are operative to shut down the product transfer valves but the gas detector means will be inoperative.

According to a second aspect of this invention there is provided a system for protection of an internal combustion engine unit which operates to stop the engine on detection of gas or possibly other hazardous vapours present in the vicinity of the engine, the system comprising an exhaust brake means associated with the exhaust system of the engine, a fuel stop device in the fuel feed to the engine, an air intake closure valve and a gas detector means, detection of gas operating the exhaust brake and the engine fuel supply cut-off and further, after a short delay, operating the engine air intake inlet valve to close same so as to isolate and shut down the engine.

When this system is associated with a product container then connection is made between the two respective gas detector means whereby actuation of the container gas detection means causes operation of the system associated with the tractor unit and vice-versa.

The engine shut down is operated without using auxiliary inert gases and may thus be reset and provides protection for an unlimited number of operations in contrast to $CO_2$ shut down systems requiring recharging of the $CO_2$ gas cylinders.

BRIEF DESCRIPTION OF THE DRAWINGS

Both aspects according to this invention are further described and illustrated in conjunction with the accompanying drawings showing preferred embodiments. In the drawings.

DESCRIPTION OF PREFERRED EMBODIMENT

Figure 1:
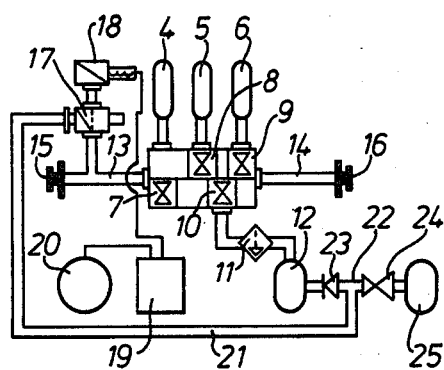
FIG. 1 shows a circuit diagram of a system for an LPG trailer.
Figure 2:
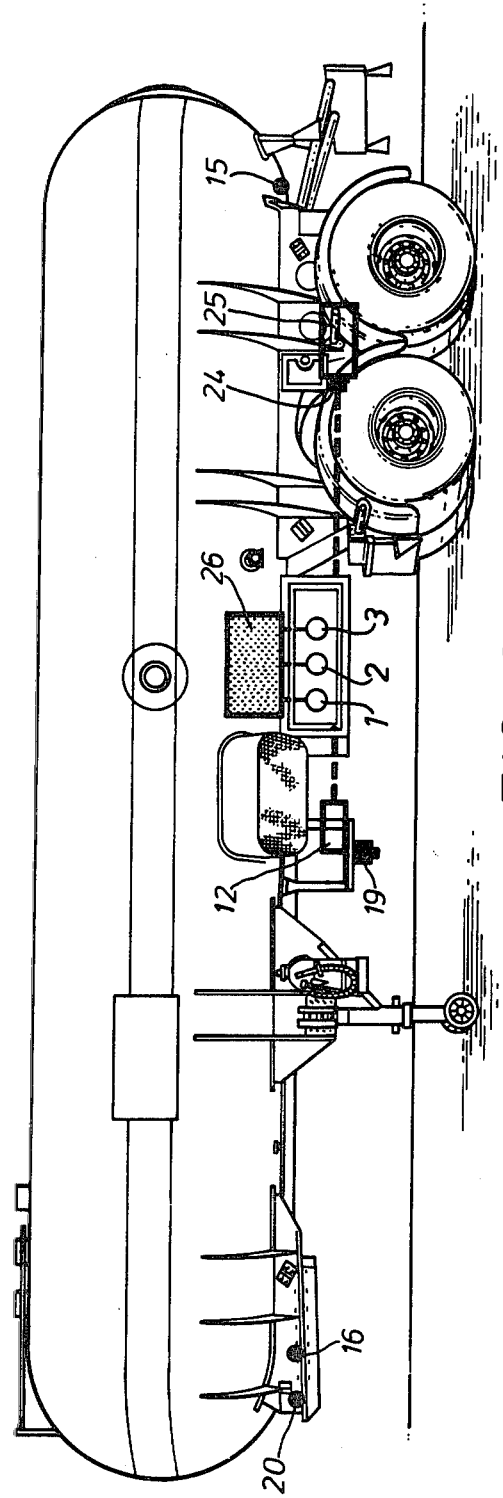
FIG. 2 shows an arrangement of this system on a trailer.

Referring to FIGS. 1 and 2, the system for protection of the trailer, with or without the tractor unit coupled, includes valves 1, 2 and 3 (FIG. 2) for the product outlet and each associated with a pneumatic actuating cylinder 4, 5 and 6 respectively. Each cylinder has an associated manually operable control valve 7, 8 and 9 respectively which is manually selected to an on or off position according to the product outlet valve required to be actuated. The control valves 7, 8 and 9 are fed through a manifold system which is connected through a charge valve 10 via a water drain filter 11 to an auxiliary air reservoir 12. The charge valve 10 is a one shot normally closed valve and may be actuated to charge the manifold with compressed air from the reservoir 12, this action then causing the product outlet valves to be actuated according to which control valve 7, 8 or 9 has been selected.

The manifold also connects with air lines 13 and 14 terminating in emergency relief valves 15 and 16 respectively. Also coupled with the manifold is a three port air operated valve 17 and an electrical solenoid operated valve 18. With the solenoid valve de-energised line 13 is vented to atmosphere and the de-energised state is produced either through no electrical connections being made or if electric power is present through detection of gas by the gas detector 19. Power for the gas detector and energisation of the solenoid 18 is effected through a coiled expansible connector 20 which couples with the tractor unit. The purpose of the valve 17 is to provide for manual override should no electrical power be present to energise solenoid 18 and for this purpose the valve connects line 13 through a further line 21 to a junction 22 between a non-return valve 23 feeding the auxiliary air reservoir 12 and a pressure check valve 24 connecting the junction to the trailer emergency air reservoir 25.

Operation of the system is as follows. The emergency air reservoir 25 associated with the trailer normally is designed to hold a pressure in excess of 75 psi thereby retaining the trailer brakes off. A pressure check valve 24 operative at about 95 psi charges the auxiliary air reservoir 12 through the non-return valve 23. With this arrangement the auxiliary air reservoir cannot reduce pressure in the emergency air reservoir 25 below the critical value (i.e. 75 psi). The charge valve 10 is normally closed and the manifold is at atmospheric pressure. Control valves 7, 8 or 9 are operated to select the particular product outlet valve 1, 2 or 3 which is to be used and operation of the valves through cylinders 4, 5, 6 is made by depression of the charge valve 10 which effects pressurisation of the manifold together with associated emergency lines 13 and 14. If electric power is present then solenoid valve 18 holds the line 13 closed and the selected product valves are opened. If solenoid valve 18 is not energised than line 13 is vented and pressurisation of the manifold is impossible and the product valves remain closed. In this condition it is possible through a manual override system to actuate the valve 17 which connects line 13 with junction 22, thereby closing the line 13 and allowing pressurisation. The purpose of the connection through line 21 is to prevent ingress of foreign matter into the system.

Assuming electrical power is present transfer of the product occurs and if an emergency should arise the system shuts down through either detection of escaping gas by the detector 19 which causes de-energisation of the solenoid 18 thus venting line 13, or alternatively line 13 or 14 can be manually vented by means of emergency release valves 15 or 16. A further valve may be provided with a quick release coupling and this can be sited at a point remote from the trailer to also effect emergency shut down. Venting of the manifolds causes closure of the product outlet valves and it is not thereafter possible to re-open these valves without re-setting the system which would required the absence of gas at the detector 19 thus allowing the solenoid 18 to close with operation once agains of the charge valve 10. The auxiliary air reservoir 12 has sufficient capacity for several operations of the product outlet valves and is replenished from the emergency air reservoir 25 which, if the tractor unit is coupled, is re-charged. However, even without the tractor unit being coupled, the auxiliary reservoir has sufficient capacity for several cycles of operation, and through the pressure check valve 24 maintenance of sufficient emergency air reservoir pressure is provided for in the trailer emergency brake system.

Figure 5:
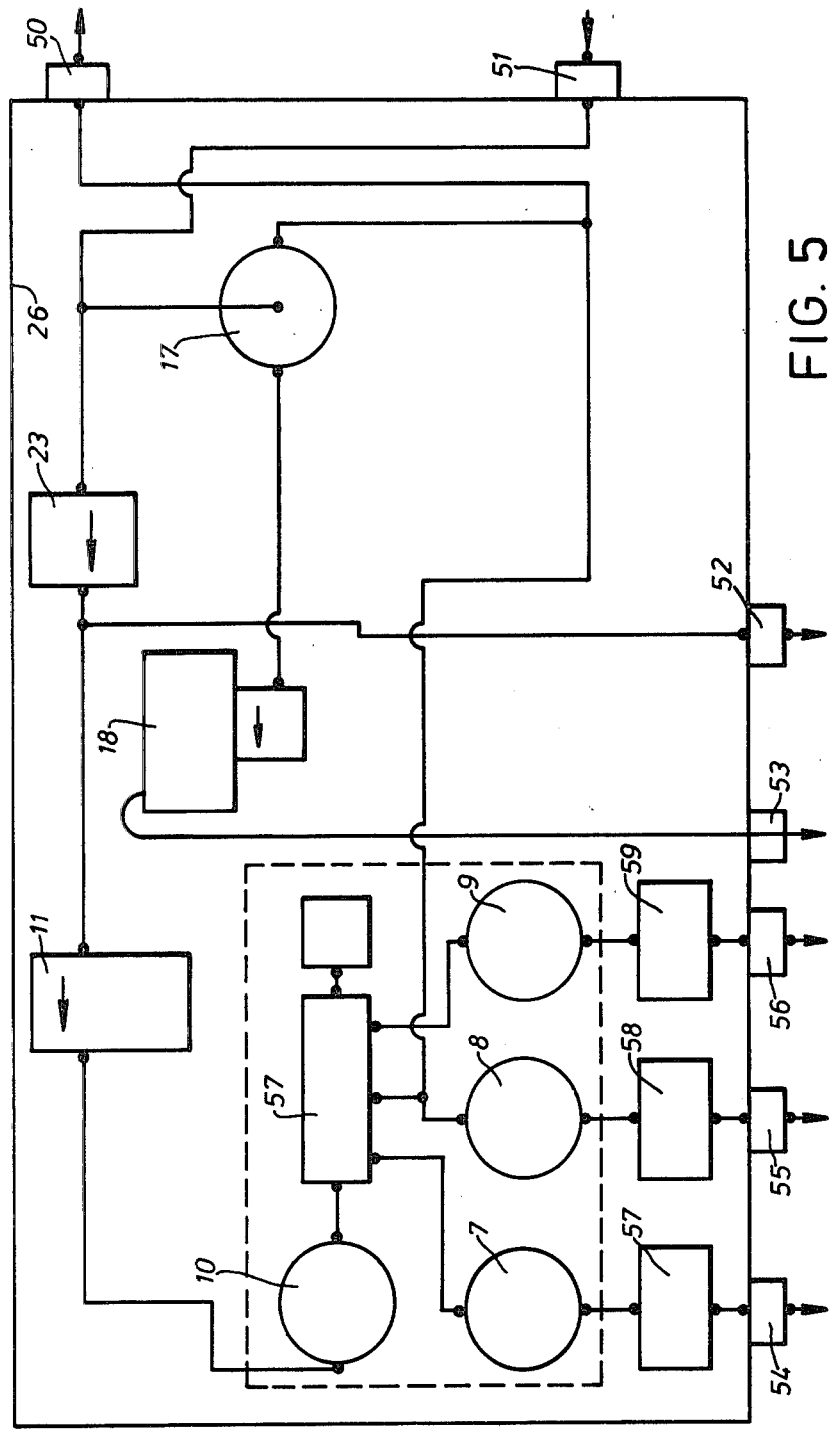
FIG. 5 shows a circuit diagram of the control box on the trailer.

FIG. 5 shows an arrangement within the control box 26 of FIG. 2 containing most of the operative parts and the control box provides connections 50 to the emergency valve lines 13 and 14, a connection 51 from the pressure check valve 24 associated with the trailer emergency air reservoir, connection 52 to the auxiliary air reservoir 12, electrical connection 53 to the gas detector circuit and connections 54, 55 and 56 for respective product valves 1, 2 and 3.

The control box includes non-return valve 23, filter 11, valve 17 and solenoid operated valve 18. Located on a face panel of the unit are the charge valve 10 comprising a push button type valve, manifold 57, connected through control valves 7, 8 and 9 comprising two position toggle valves with dump valves 57, 58 and 59 associated with the outlets to the product valves 1, 2 and 3. The dump valves are provided to ensure that any pressure change occurring between respective ports of the valve cause the valve to open and thereby vent to atmosphere, thus if any fault occurs in the product outlet valve or associated pneumatic system the dump valves will operate to effectively vent the manifold system thereby causing fail-safe shut down. With this arrangement it is not necessary for the manifold system to vent completely before closure of the product valve occurs, but each valve has its own associated venting arrangement ensuring a rapid and individual closure.

Figure 3:
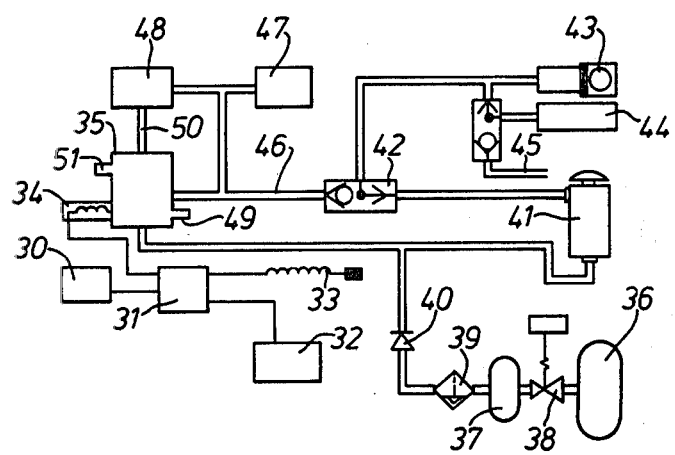
FIG. 3 shows a circuit diagram of a vehicle engine protection system.
Figure 4:
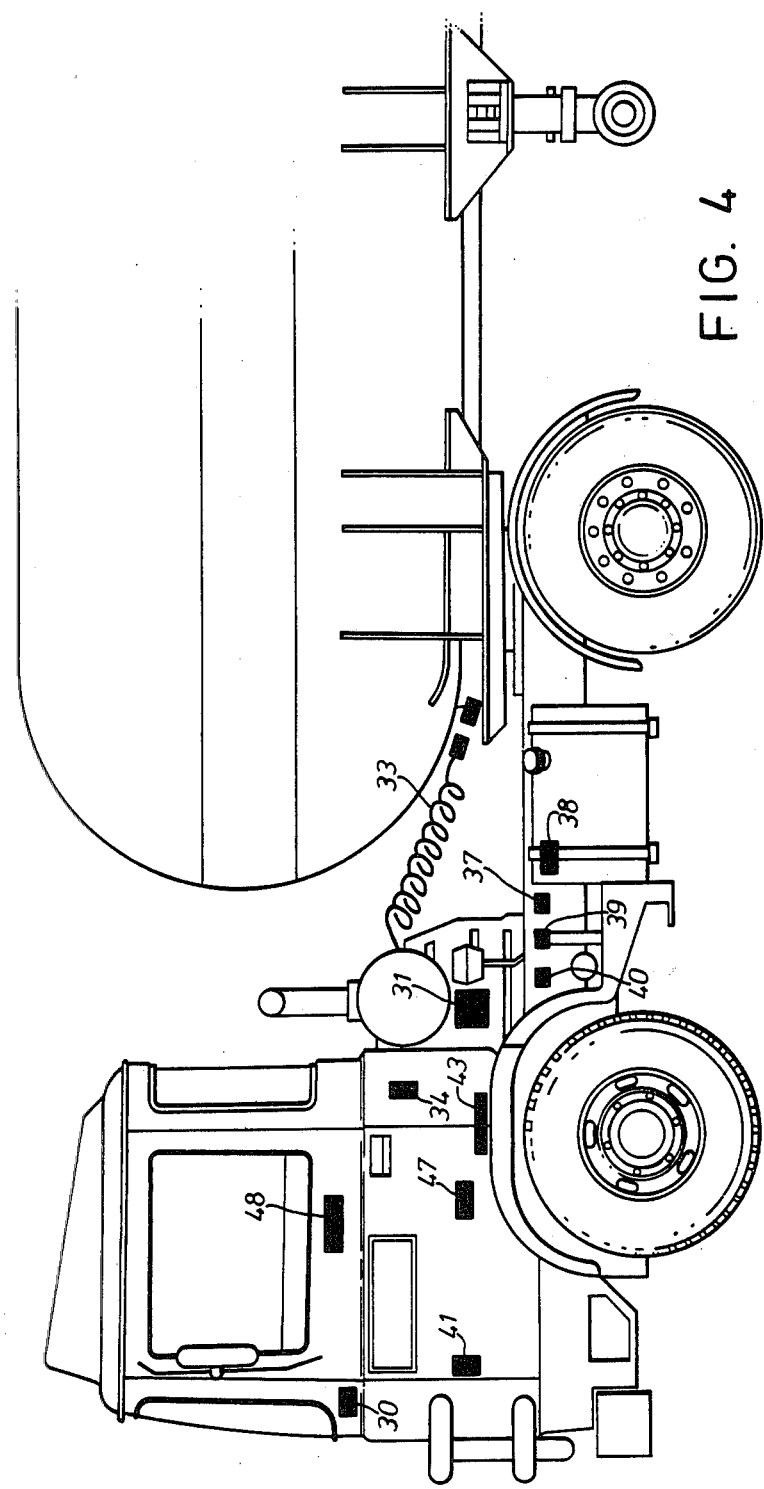
FIG. 4 shows the arrangement of the system on a tractor unit for the trailer of FIG. 2.

FIGS. 3 and 4 of the drawings show a system applied to the tractor unit which primarily is for shutting down the engine in emergency but which also couples with the previously described trailer mounted system. Referring mainly to FIG. 3, this arrangement comprises a cab console unit 30 which couples with a junction box unit incorporating gas detector 31 with a master switch 32. The console includes reset and override controls together with an indication of whether gas is present or not. The junction box connects with a coiled cable 33 and this serves to couple the trailer mounted unit into the system so that gas detected at either point will cause operation. The gas detector unit is connected with solenoid 34 which operates a valve assembly 35. The system is again pneumatically operated from the vehicle emergency air tank 36 which is connected to an auxiliary tank 37 through a pressure check valve 38. Filter 39 and non-return valve 40 are provided through which air is supplied to the system. A cab floor foot button 41 is provided which when actuated causes air to be fed through shuttle valve 42 to the exhaust brake 43 and throttle control linkage 44. Thus, the driver may actuate button 41 to cause operation of the exhaust brake 43 with accompanying closure of the throttle via linkage 44. This for example being used to assist braking of the vehicle if required. The exhaust brake 43 and throttle linkage 44 may be coupled with the existing govenor air supply 45 of the vehicle. When gas is detected by unit 31 the solenoid valve 34 operates and this feeds air through line 46 to the shuttle valve 42. Thus, the exhaust brake 43 and throttle linkage 44 are actuated. In addition, fuel to the engine is cut off by means of a fuel stop valve 47 and a double acting air intake closure system 48 is operated. Normally when the system is set the solenoid 34 will be energised and line 46 vented to atmosphere at 49. In addition, when the solenoid is energised in the set condition one side of the double acting intake device 48 is pressurised through line 50, this line being bled to atmosphere on de-energisation of the solenoid through bleed 51. With this arrangement when gas is detected, solenoid 34 de-energises to apply air to line 46 whilst line 50 slowly bleeds so that the exhaust brake system 43 and fuel valve 47 operate immediately, whereas the air intake is closed after a short delay of about half a second whilst line 50 bleeds.

When solenoid 34 de-energises this also causes de-energisation of the solenoid in the trailer unit and isolation of all electrical power through the cable 33 and hence closure of all the product valves is obtained if a trailer is connected. If a trailer is connected and has a unit as previously described then detection of gas at the trailer cause the tractor system to operate via the cable connection 33.

It is preferable to provide a manual override so that the engine shut down system can be by-passed temporarily following actuation when the vehicle is on the move.

We claim:

1. A control system for the product outlet valves of a storage tank, the system comprising one or more pneumatically operated valves associated with the or each product outlet of the storage tank, a control valve connected to an air reservoir through a charge valve for effecting operation of the pneumatic outlet valves, the charge valve being of a single shot type for pressurising a manifold connected to the product outlet valve or valves, the manifold being associated with one or more emergency release valves and a further solenoid operated valve operatively connected with a gas detector means, detection of escaping product vapour by the gas detector or actuation of the emergency release valve effecting discharge of pressure in the manifold by venting to close the product outlet valves by release of said pressure, the control valves thereafter being inoperative until the charge valve is actuated to re-pressurise the manifold.

2. A control system in accordance with claim 1, wherein the air reservoir is coupled with an emergency air reservoir associated with a storage tank which is constructed as a vehicle trailer, a pressure check valve being provided operative to prevent air reservoir pressure being reduced below a value which would result in automatic application of the trailer brake system.

3. A control system in accordance with claim 1, wherein emergency release valves are provided at each end of the container.

4. A control system in accordance with claim 1, wherein a solenoid operated valve is connected with the manifold, the valve being normally open to vent the manifold when no electric power is fed to the system.

5. A control system in accordance with claim 1, wherein each product outlet valve has a pressure differential sensing dump valve operatively arranged whereby detection of a predetermined pressure change in the air supply to the product valve operates the dump valve to vent the supply to atmosphere.

6. A control system in accordance with claim 1, in combination with a system for protection of an internal combustion engine unit which stops the engine in a safe manner on detection of gas or possibly other hazardous vapours present in the vicinity of the engine, the system comprising an exhaust brake means associated with the exhaust system of the engine, a fuel stop device in the fuel feed to the engine, an air intake closure valve and a gas detector means, detection of gas operating the exhaust brake and the engine fuel supply cut-off and further, after a short delay determined by a delay means, operating the engine air intake inlet valve to close same so as to isolate and shut down the engine.

7. A control system in accordance with claim 6, wherein the gas detection means of the engine and the gas detection means of the trailer are operatively connected in parallel whereby actuation of the container gas detection means causes operation of the system associated with the tractor unit and vice-versa.

8. A control system in accordance with claim 6, comprising a cab console unit coupled with a gas detector, the console including system reset and manual override control means together with a gas indicating means, a junction box connecting through a cable with a trailer, mounted unit whereby gas detected at either engine or trailer will effect operation, the gas detector unit of the engine being connected with a solenoid which operates a valve assembly fed from a vehicle air tank through an auxiliary tank with an interposed pressure check valve, a cab floor foot operated switch which when actuated causes air to be fed through a shuttle valve to close the exhaust brake and throttle via a control linkage, the solenoid valve operating to feed air to the shuttle valve to close the exhaust brake and throttle and to cut-off fuel to the engine by means of a fuel stop valve and to operate an engine air intake closure system through a bleed so that the exhaust brake system and fuel valve operate immediately, and the air intake is closed after a delay of about half a second.

* * * * *